No. 866,067. PATENTED SEPT. 17, 1907.
F. REED.
LIQUID AGITATOR.
APPLICATION FILED FEB. 11, 1907.

2 SHEETS—SHEET 1.

WITNESSES:
O. R. Erwin.
M. M. Schulz

INVENTOR
Frank Reed
By Erwin & Wheeler
ATTORNEYS

No. 866,067.
PATENTED SEPT. 17, 1907.
F. REED.
LIQUID AGITATOR.
APPLICATION FILED FEB. 11, 1907.
2 SHEETS—SHEET 2.
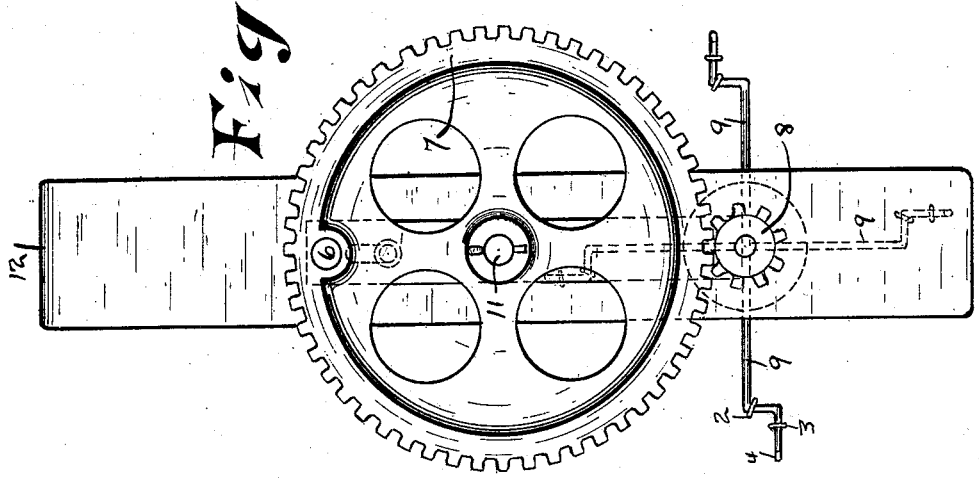
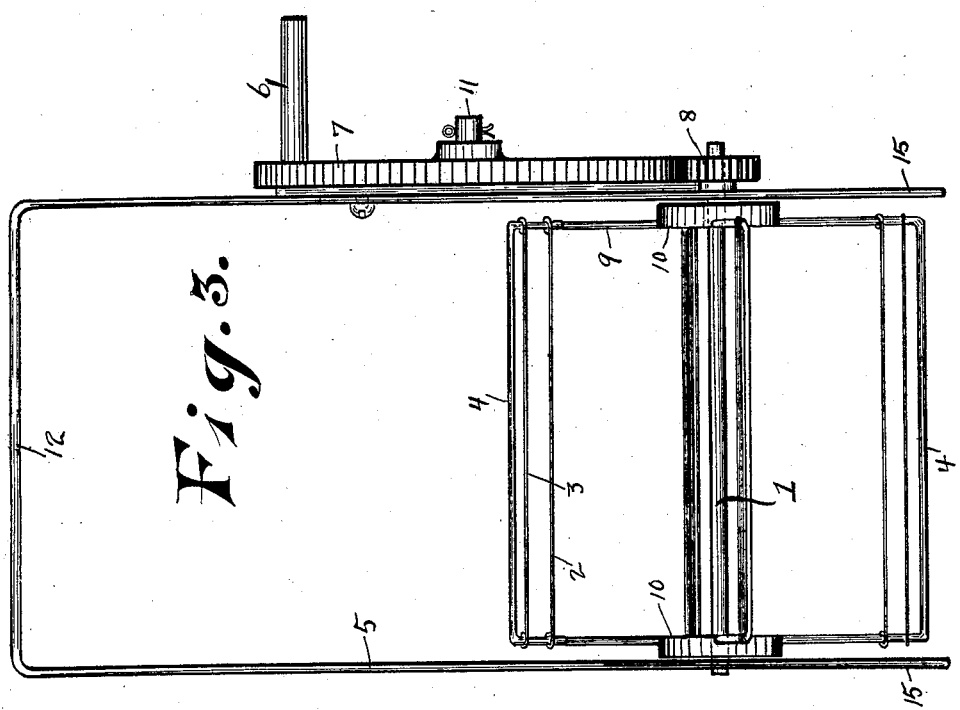
WITNESSES:
O. R. Erwin
M. M. S. Lutz
INVENTOR
Frank Reed
By Erwin & Wheeler
ATTORNEYS.

UNITED STATES PATENT OFFICE.

FRANK REED, OF MILWAUKEE, WISCONSIN.

LIQUID-AGITATOR.

No. 866,067.   Specification of Letters Patent.   Patented Sept. 17, 1907.

Application filed February 11, 1907. Serial No. 356,774.

*To all whom it may concern:*

Be it known that I, FRANK REED, a citizen of the United States, residing at Milwaukee, county of Milwaukee, and State of Wisconsin, have invented new and useful Improvements in Liquid-Agitators, of which the following is a specification.

My invention relates to improvements in that class of liquid agitators which are adapted to be used for whipping cream, beating eggs, etc., and it pertains more especially among other things to the means of supporting in operative position the beating blades and driving mechanism from a single frame which frame is adapted to be temporarily connected with a liquid receptacle and readily removed therefrom without disconnecting such working parts, whereby the operative mechanism and receptacle when thus separated may be readily cleaned and the receptacle, may, if desired, be used for other purposes, also whereby the operative mechanism may, if desired, be used for stirring liquid ingredients in any other ordinary receptacle without regard of its special adaptation to such purposes.

Figure 1:
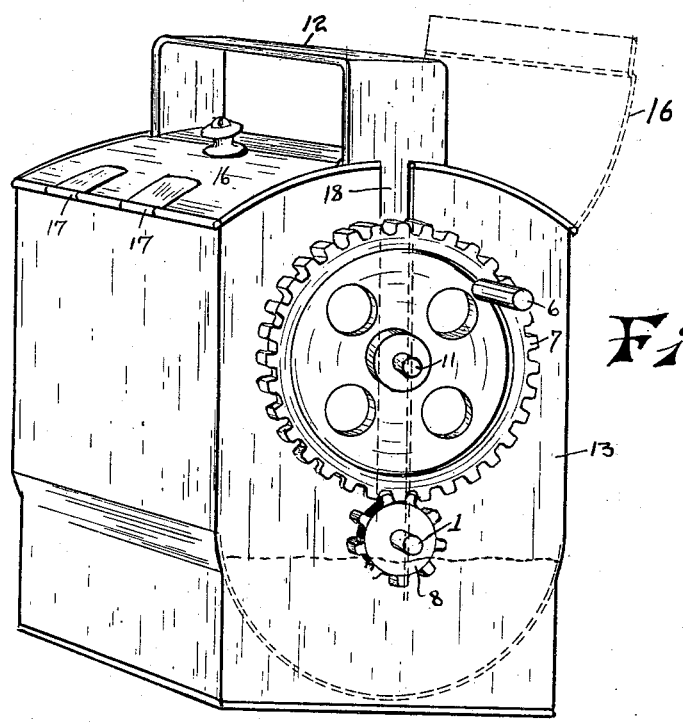
Figure 2:
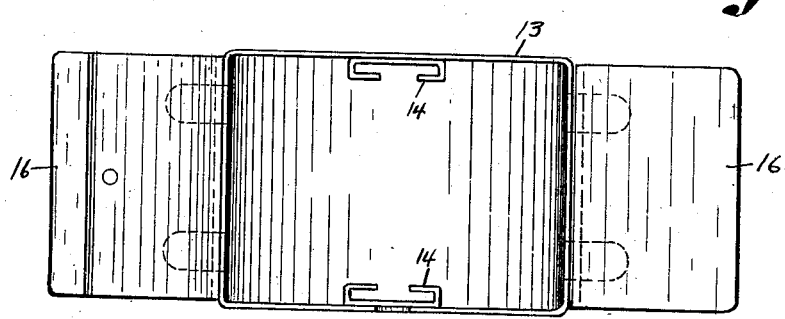

My invention is further explained by reference to the accompanying drawings, in which, Figure 1 is a perspective view thereof. Fig. 2 is a top view of the liquid receptacle, with the beating blades and operating mechanism removed. Fig. 3 is a side view of the beating blades, operating mechanism and their supporting frame removed from the liquid receptacle. Fig. 4 is an end view of the device shown in Fig. 3.

Like parts are identified by the same reference figures throughout the several views.

1 represents a revoluble shaft from and by which the beating blades 2, 3 and 4 are revolubly supported on the frame 5. Motion is communicated to the beating blades from the handle 6 through the gear wheel 7, pinion 8, shaft 1 and radial arms 9, the radial arms 9 being connected with the shaft 1 by the annular collars 10 and which are rigidly affixed to the shaft 1 and adapted to revolve with it, while the radial arms 9 are secured to the periphery of the collar 10 by solder or in any equivalent manner. The radial arms 9 and beating blade 4 are preferably formed integrally from single rod of metal which is first bent in the U-shape shown when its opposing ends are rigidly affixed to the periphery or sides of the collars 10. The gear wheel 7 is connected with the frame 5 by the supporting trunnion 11, which trunnion is rigidly affixed at one end to one side of said frame. The sides of the frame 5 extends slightly below the lower side of the beating blades 4, whereby when said frame rests upon the bottom of a receptacle the beating blades may revolve free from contact therewith. The central portion 12 of the frame 5 serves as a handle for holding and carrying the operative mechanism when removed from the liquid receptacle 13, which receptacle is provided at its respective ends with vertical retaining bearings 14, 14, for the reception of the vertical sides 15, 15, of the frame 5. Thus it is obvious that when desirous to use my device, the lower ends of the sides 15 are inserted between the opposing bearings of the flanges 14 and pressed downwardly until the lower ends of said sides 15 are brought to the bottom of the receptacle when said flanges will hold the operating mechanism rigidly in place. This being done the device is ready for use.

The receptacle 13 is preferably provided with two opposing covers 16 which are secured to the respective sides of the receptacles by hinges 17, 17 in the ordinary way. The height of the frame 5 is such that the upper sides of said cover 16 are free to pass the central portion of the handle 12 when said covers are closed. It will be obvious that the sides 15, 15, of the frame not only serve as a means of supporting the beating blades and operating mechanism but also as a means of handling such mechanism when removed from the liquid receptacle, while one side of said frame performs the additional function of closing the vertical slots 18 which is formed in one end of the receptacle for the reception of the shaft 1.

In using the device it will be understood that the receptacle is filled only to a point slightly below the lower end of said slot 18 as indicated in Fig. 1. When, however the cream or other contents of the receptacle has been whipped a sufficient length of time, such contents are usually caused to foam and expand so as to fill the upper part of the vessel in which case the side of the frame serves to prevent the cream or other material which has been thus expanded by whipping from escaping from the receptacle.

Having thus described my invention what I claim as new and desire to secure by Letters Patent is,

1. In a liquid agitator the combination with a U-shape frame of a set of beating blades and radial blade supporting arms revolubly supported from the respective sides thereof, and operating mechanism permanently connected with said frame for actuating said blades.

2. In a liquid agitator the combination of a U-shape frame, a set of beating blades and radial blade supporting arms revolubly supported from said frame, mechanism comprising a toothed gear wheel and a pinion permanently connected with said frame for operating said blades, a liquid receptacle and means for temporarily supporting said frame together with the operating mechanism within said receptacle.

3. The combination of an integrally formed U-shape frame, a shaft revolubly supported at its respective ends from the respective sides of said frame, a plurality of beating blades supported from said shaft, a pinion mounted upon one end of said shaft, a gear wheel revolubly supported from one side of said frame in mesh with said pinion, an operating handle secured to one side of said gear wheel, a liquid tank provided upon one side with a vertical slot for the reception of said shaft and means connected with the walls of said receptacle for rigidly holding said frame and operative mechanism removably in place within said receptacle, all substantially as and for the purpose specified.

In testimony whereof I affix my signature in the presence of two witnesses.

FRANK REED.

Witnesses:
JAS. B. ERWIN,
O. R. ERWIN.